United States Patent [19]

Itoh et al.

[11] 4,164,491

[45] Aug. 14, 1979

[54] THERMALLY CURABLE SILICONE RUBBER COMPOSITIONS

[75] Inventors: Kunio Itoh; Takeshi Fukuda, both of Annaka, Japan

[73] Assignee: Shin-Etsu Chemical Co., Ltd., Toyko, Japan

[21] Appl. No.: 871,849

[22] Filed: Jan. 24, 1978

[30] Foreign Application Priority Data

Jan. 27, 1977 [JP] Japan ................................. 52-7308

[51] Int. Cl.$^2$ .............................................. C08L 83/04
[52] U.S. Cl. ............................. 260/37 SB; 260/37 N; 525/440
[58] Field of Search ........................ 260/824 R, 37 SB

[56] References Cited

U.S. PATENT DOCUMENTS

| | | | |
|---|---|---|---|
| 3,355,526 | 11/1967 | Molnar | 260/824 R |
| 3,377,308 | 4/1968 | Oertel et al. | 260/824 R |
| 3,674,891 | 7/1972 | Wheeler | 260/824 R |

*Primary Examiner*—Lewis T. Jacobs
*Attorney, Agent, or Firm*—Toren, McGeady and Stanger

[57] ABSTRACT

A novel thermally curable silicone rubber composition which is useful for the preparation of silicone rubber elastomers comprises diorganopoly-siloxane gum, a polyurethane elastomer having a softening point of not lower than 100° C., a reinforcing filler, and an organic peroxide. The silicone rubber elastomers cured have an excellent resistance to mineral oils and organic solvents as well as other properties that are inherent in conventional silicone rubbers.

9 Claims, No Drawings

THERMALLY CURABLE SILICONE RUBBER COMPOSITIONS

BACKGROUND OF THE INVENTION

The present invention relates to novel thermally curable silicone rubber compositions. In particular, the invention relates to novel and improved silicone rubber compositions that are thermally curable into rubbery elastomers having an excellent resistance to oils and organic solvents, as well as superior mechanical strengths.

In general, silicone rubbers, the molecular structure of which is composed of polysiloxane chains, have excellent heat stability, weathering resistance, electric properties, and the like, and have a wide field of applications for, in example, parts of automobiles and electric appliances. However, such silicone rubbers are disadvantaged by their inferior resistance to oils and organic solvents, resulting in limitations in the application field. It has, therefore, been desired to remove such disadvantage, but no satisfactory results have been obtained hitherto.

SUMMARY OF THE INVENTION

It is, therefore, the object of the present invention to provide a novel and improved thermally curable silicone rubber composition capable of producing cured silicone rubber elastomers having an excellent resistance to oils, or particularly organic solvents, as well as other properties that are inherent in conventional silicone rubbers.

Another object of the present invention is to provide a thermally curable silicone rubber composition which exhibit very little swelling in volume when immersed in mineral oils or in aliphatic or aromatic non-polar solvents, retaining its mechanical strengths and other inherent properties.

In accordance with the present invention, the thermally curable silicone rubber composition comprises (a) 100 parts by weight of a diorganopolysiloxane gum, (b) 10 to 200 parts by weight of a polyurethane elastomer having a softening point of not lower than 100° C., (c) 10 to 400 parts by weight of a reinforcing filler, and (d) 0.1 to 10 parts by weight of an organic peroxide.

DETAILED DESCRIPTION OF THE PREFERRED EMBODIMENTS

The diorganopolysiloxane gum as component (a) useful in the compositions of the present invention is an organopolysiloxane having a substantially linear molecular structure, which is expressed by the average unit formula

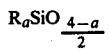

$$R_a SiO_{\frac{4-a}{2}}$$

where R is a substituted or unsubstituted monovalent hydrocarbon group selected from the class consisting of ethyl, methyl, trifluoropropyl, phenyl, and vinyl groups, and a is a positive number in the range from 1.95 to 2.02.

The diorganopolysiloxane gum is prepared by a method hitherto known in the art wherein cyclic organosiloxanes, such as octamethylcyclotetrasiloxane, octaphenylcyclotetrasiloxane, and sym-tetramethyltetravinylcyclotetrasiloxane, either singly or in mixture in an appropriate proportion, is subjected to polymerization by ring opening in the presence of an acid catalyst or an alkali catalyst to the desired degree of polymerization. The desired, average degree of polymerization of the diorganopolysiloxane is 3,000 or higher so that the resulting cured silicone rubbers have satisfactorily high mechanical strengths.

The terminal groups blocking the chain ends of the diorganopolysiloxane molecules are not limitative, but may be either triorganosilyl groups, such as trimethylsilyl groups, or silanol groups. It is preferred that the organic groups represented by the symbol R in the average unit formula are composed of 2 mole % or less of alkenyl groups, e.g. vinyl and allyl groups, and 20 mole % or less of phenyl groups, the balance being methyl groups, from the point of view that the diorganopolysiloxane gum should be compatible with the polyurethane elastomer as another component (b) of the composition.

The polyurethane elastomer as component (b) essentially has a softening point of at least 100° C. This is because any polyurethane elastomers having a lower softening point give an insufficient heat stability to the resulting thermally cured silicone rubber elastomer.

The polyurethane elastomers are thermoplastic polymers which are prepared by polyaddition reaction between an organic compound having two hydroxy groups in a molecule and a diisocyanate compound, and may be divided into two types, i.e. the polyether and polyester types.

The hydroxy-containing compounds used in the preparation of the polyether type polyurethanes are exemplified by polyethylene glycols having an average degree of polymerization corresponding to the average molecular weight of 1,000 to 6,000, or polypropylene glycols having an average degree of polymerization corresponding to the average molecular weight of 1,000 to 2,000. The hydroxy-containing compounds used in the preparation of the polyester type polyurethanes are exemplified by those having an average molecular weight of 1,000 to 3,000 as synthesized by the esterification reaction between a glycol, such as polyethylene glycols, polydiethylene glycols, and polytrimethylene glycols, and a dibasic acid, such as succinic acid, adipic acid, sebacic acid. Another ingredient used in the polyaddition reaction for the preparation of the polyurethane elastomers, i.e. diisocyanate compounds are exemplified by hexamethylene diisocyanate, toluene 2,4-diisocyanate, 1,3-phenylene diisocyanate, and naphthalene diisocyanate.

The amount of the polyurethane elastomer as component (b) in the composition of the present invention is from 10 to 200 parts by weight or, preferably, from 20 to 50 parts by weight per 100 parts by weight of component (a) so that the resulting cured silicone rubber elastomer has well-balanced properties.

The reinforcing filler as component (c) in the composition of the present invention may be any one of the fillers conventionally employed in the art of silicone rubbers. Examples are finely divided silica fillers, e.g. fumed silica and precipitated silica. The amount of the reinforcing filler is in the range from 10 to 400 parts by weight per 100 parts by weight of component (a). Any non-reinforcing fillers, such as diatomaceous earth, calcium carbonate, carbon black, titanium dioxide, and aluminum oxide, may optionally be added in an appropriate amount.

The organic peroxide as component (d) is used to effect the cure of the composition of the present invention by forming crosslinks therein. Examples include dicumyl peroxide, t-butyl peroxide, dichlorobenzoyl peroxide, benzoyl peroxide, t-butyl perbenzoate, and 2,5-dimethyl-2,5-bis(t-butylperoxy) hexane. The amount of the organic peroxide to be used is from 0.1 to 10 parts by weight per 100 parts by weight of component (a).

In the case where all components are blended together by a roller or a kneader in hot, as recommended depending on the proportion of components (a) and (b) used, it is preferred that the organic peroxide as component (d) is selected from di-t-butyl peroxide, dicumyl peroxide, and 2,5-dimethyl-2,5-bis(t-butylperoxy) hexane that have a relatively high decomposition temperature, thus the peroxide used being prevented from decomposition during the hot blending operation.

The order in which the individual components (a) to (d) are blended is not critically limited, but it is usual that components (a) and (b) are first blended by a blending machine, such as a hot roller blender or a kneader blender, followed by the addition of components (c) and (d) and further blending to form a uniform blend. Alternatively, components (a) and (c) are blended first by a blending machine, such as a roller blender, kneader blender, or Banbury mixer, followed by adding component (b) by use of a blending machine, such as a roller blender or kneader blender operated in hot, and finally component (d).

It is optional that the composition of the present invention is mixed with certain conventional auxiliary additives including a dispersing agent, such as diphenylsilane diol; heat stability improver, such as iron oxide, ceric oxide or iron octoate; condensation catalyst, such as tin octoate or tin laurate; and coloring agent, such as pigment, in an amount such that the properties of the resulting composition should not be unduely impaired.

The thermally curable silicone rubber composition of the present invention is subjected to cure by, for example, heating at a temperature of 100° to 400° C. for 30 seconds to 1 hour under atmospheric pressure or a higher pressure to effect the formation of crosslinks, followed, if necessary, by post-curing at a temperature from 150° to 250° C. for 1 to 2 hours. The thus cured silicone rubber is highly resistant to oils and organic solvents and has sufficient mechanical strengths. The step of the post-curing is effective in remarkably improving the mechanical strengths of the cured silicone rubber to an extent such that, for example, tensile strength increases to as high as 130 kg/cm$^2$, exhibiting about 50% increase compared to the value observed before the post-curing. The mechanism of such improvement of mechanical strengths is not well understood, but it is presumed that certain chemical bonding is formed between the diorganopolysiloxane gum or the reinforcing filler and the polyurethane elastomer.

The silicone rubber elastomers obtained by curing the composition of the present invention, that have excellent resistance to mineral oils and organic solvents as well as high mechanical strengths, are useful in a wide field of applications including parts of transport vehicles, such as automobiles and airplanes, and hydraulic instruments using mineral oils in the form of oil seals, gaskets, diaphragms and various kinds of hoses.

The following examples will illustrate the compositions of the present invention in further detail. In the examples parts are parts by weight. Further in the examples silicone gum compounds (A) and (B) are what were prepared in the following procedures.

Preparation of silicone gum compound (A)

Into 100 parts of an organopolysiloxane gum having an average degree of polymerization of about 8,000, composed of 99.8 mole % of dimethylsiloxane units and 0.15 mole % of methylvinylsiloxane units, and terminated at both chain ends with dimethylvinylsilyl groups were added 35 parts of a fumed silica having a specific surface area of about 200 m$^2$/g, 2.5 parts of diphenylsilane diol, and 5 parts of a dimethylpoly-siloxane fluid having a viscosity of about 20 centi-stokes at 25° C. terminated at both chain ends with hydroxy groups. The resulting mixture was uniformly blended on a kneader blender, followed by heat treatment at 160° C. for 2 hours.

Preparation of silicone gum compound (B)

Into 100 parts of an organopolysiloxane gum having an average degree of polymerization of about 8,000, composed of 99.8 mole % of dimethylsiloxane units and 0.2 mole % of methylvinylsiloxane units, and terminated at both chain ends with dimethylvinylsilyl groups was added 35 parts of a precipitated silica. The resulting mixture was blended on a kneader blender, followed by heat treatment at 160° C. for 2 hours.

Furthermore, "Resistance to organic solvent" and "Resistance to mineral oil" as set forth in the table attached to each example are what were determined in the following procedures.

Resistance to organic solvent

The test sheet obtained by post-cure at 150° C. for 4 hours in accordance with the procedure of the example concerned was kept immersed in a mixed solvent of toluene and isooctane in a proportion of 1:1 by volume at 25° C. for 72 hours. Thereupon the sheet was taken out of the solvent and determined for increases in volume compared to the volume before the immersion.

Resistance to mineral oil

The same test sheet as obtained in the test for resistance to organic solvents was kept immersed in No. 3 mineral oil at 150° C. for 72 hours. Thereupon, the sheet was taken out of the oil and determined for increases in volume compared to the volume before the immersion in accordance with Japanese Industrial Standard (JIS) K 6301.

EXAMPLE 1

Silicone gum compound (A), a thermoplastic polyurethane elastomer (Bandex T-5167, product of Dai-Nippon Ink and Chemical Industry Inc., Japan) and fumed silica having a specific surface area of about 200 m$^2$/g were blended together in the proportions as indicated in Table I on a hot kneader at 200° C. for 30 minutes, to form a uniform mixture. Then, to this mixture 0.8 part of 2,5-dimethyl-2,5-di(t-butylperoxy) hexane was added and further blended with a hot roller at 70° C. The resulting composition was pressed and cured at 170° C. for 10 minutes under a 30 kg/cm$^2$ pressure to form sheets 2 mm thick, followed by post-curing at 150° C. or at 170° C. for the varied periods of time as indicated in the table.

Each sheet thus obtained was determined for hardness (according to Japanese Industrial Standard), ultimate elongation, and tensile strength. The results are shown in the table. The data of resistance to mineral oils and organic solvents as set forth hereinbefore are also shown in the table.

In comparison, a composition was prepared using 100 parts of silicone gum compound (A) and none or 0.8 part of fumed silica omitting the polyurethane component, and 2-mm thick sheets were formed therefrom in the same manner as above. The test results are given in the same table.

Table I

| Experiment Number | 1 | 2 | 3* | 4* |
|---|---|---|---|---|
| Silicone gum compound (A), parts | 75 | 70 | 100 | 100 |
| Bandex T-5167, parts | 25 | 30 | 0 | 0 |
| Fumed silica, parts | 8 | 10 | 0 | 8 |
| Post-cure, 150° C., 4 hrs.: | | | | |
| Hardness | 73 | 76 | 54 | 60 |
| Elongation, % | 325 | 310 | 480 | 420 |
| Tensile strength, kg/cm² | 105 | 107 | 100 | 100 |
| Post-cure, 150° C., 7 days: | | | | |
| Hardness | 78 | 80 | 55 | 66 |
| Elongation, % | 300 | 295 | 405 | 360 |
| Tensile strength, kg/cm² | 124 | 118 | 97 | 95 |
| Post-cure, 150° C., 16 days: | | | | |
| Hardness | 78 | 80 | 56 | 68 |
| Elongation, % | 300 | 295 | 350 | 330 |
| Tensile strength, kg/cm² | 108 | 109 | 98 | 90 |
| Post-cure, 180° C., 5 days: | | | | |
| Hardness | 80 | 82 | 57 | 69 |
| Elongation, % | 245 | 200 | 391 | 350 |
| Tensile strength, kg/cm² | 103 | 97 | 93 | 90 |
| Resistance to organic solvent, ΔV % | 107 | 134 | 280 | 170 |
| Resistance to mineral oil, ΔV % | 39 | 37 | 53 | 50 |

*Comparative experiment.

EXAMPLE 2

Cured silicone rubber sheets 2 mm thick were prepared in the same manner as in Example 1, using silicone gum compound (B), the same polyurethane elastomer (Bandex T-5167) as in Example 1, fumed silica having a specific surface area of about 200 m²/g or precipitated silica in the proportions as indicated in Table II, and the same organic peroxide, i.e. 2,5-dimethyl-2,5-di(t-butyl-peroxy) hexane, as in Example I. The test results obtained for these sheets are set out in Table II.

Table II

| Experiment Number | 5 | 6 | 7 | 8 |
|---|---|---|---|---|
| Silicone gum compound (B), parts | 70 | 70 | 55 | 45 |
| Bandex T-5167, parts | 30 | 30 | 45 | 55 |
| Fumed silica, parts | 10 | 0 | 0 | 0 |
| Precipitated silica, parts | 0 | 25 | 15 | 20 |
| Post-cure, 150° C., 4 hrs.: | | | | |
| Hardness | 74 | 80 | 86 | 92 |
| Elongation, % | 295 | 155 | 100 | 50 |
| Tensile strength, kg/cm² | 103 | 84 | 85 | 93 |
| Post-cure, 150° C., 7 days: | | | | |
| Hardness | 78 | 84 | 86 | 92 |
| Elongation, % | 265 | 190 | 125 | 70 |
| Tensile strength, kg/cm² | 129 | 114 | 95 | 121 |
| Post-cure, 150° C., 16 days: | | | | |
| Hardness | 82 | 84 | 86 | 90 |
| Elongation, % | 280 | 165 | 115 | 105 |
| Tensile strength, kg/cm² | 114 | 94 | 106 | 125 |
| Post-cure, 180° C., 5 days: | | | | |
| Hardness | 82 | 88 | 92 | 95 |
| Elongation, % | 180 | 145 | 60 | 35 |
| Tensile strength, kg/cm² | 106 | 95 | 98 | 122 |
| Resistance to organic solvent, ΔV % | 117 | 91 | 77 | 75 |
| Resistance to mineral oil, ΔV % | 33 | 31 | 26 | 15 |

EXAMPLE 3

Silicone rubber compositions were prepared by uniformly mixing silicone gum compound (B), the same polyurethane Bandex T-5167 as used in Example 1 or another brand thereof Bandex T-5165, a reinforcing filler, Ultrasil (product of Degussa, Inc.), and a non-reinforcing filler, diatomaceous earth in the proportions as indicated in Table III, followed by adding 1 part of 2,5-dimethyl-2,5-di(t-butyl-peroxy) hexane. The thus prepared compositions were shaped and cured into sheets 2 mm thick in the same manner as in Example 1. The test results are set out in Table III.

Table III

| Experiment Number | 9 | 10 | 11 | 12 |
|---|---|---|---|---|
| Silicone gum compound | 70 | 55 | 65 | 55 |
| Bandex T-5167, parts | 30 | 45 | 0 | 0 |
| Bandex T-5165, parts | 0 | 0 | 35 | 45 |
| Ultrasil VN3, parts | 15 | 15 | 15 | 15 |
| Diatomaceous earth, parts | 35 | 35 | 35 | 35 |
| Post-cure, 150° C., 4 hrs.: | | | | |
| Hardness | 88 | 90 | 88 | 88 |
| Elongation, % | 85 | 82 | 73 | 87 |
| Tensile strength, kg/cm² | 86 | 99 | 81 | 111 |
| Post-cure, 150° C., 7 days: | | | | |
| Hardness | 88 | 90 | 90 | 94 |
| Elongation, % | 84 | 80 | 100 | 107 |
| Tensile strength, kg/cm² | 96 | 106 | 101 | 116 |
| Post-cure, 150° C., 16 days: | | | | |
| Hardness | 88 | 90 | 88 | 90 |
| Elongation, % | 94 | 92 | 90 | 88 |
| Tensile strength, kg/cm² | 90 | 104 | 87 | 102 |
| Post-cure, 180° C., 5 days: | | | | |
| Hardness | 88 | 92 | 88 | 88 |
| Elongation, % | 76 | 70 | 100 | 100 |
| Tensile strength, kg/cm² | 90 | 118 | 82 | 96 |
| Resistance to organic solvent, ΔV % | 82 | 62 | 80 | 62 |
| Resistance to mineral oil ΔV % | 27 | 24 | 28 | 24 |

What is claimed is:

1. A thermally curable silicone rubber composition consisting essentially of
   (a) 100 parts by weight of a diorganopolysiloxane gum,
   (b) from 10 to 200 parts by weight of a polyurethane elastomer having a softening point not lower than 100° C.,
   (c) from 10 to 400 parts by weight of a reinforcing filler, and
   (d) from 0.1 to 10 parts by weight of an organic peroxide.

2. The thermally curable silicone rubber composition as claimed in claim 1 wherein the diorganopolysiloxane gum is expressed by the average unit formula $$R_a SiO_{\frac{4-a}{2}}$$

where R is a substituted or unsubstituted monovalent hydrocarbon group selected from the class consisting of methyl, ethyl, trifluoropropyl, phenyl and vinyl groups and a is a positive number in the range from 1.95 to 2.02.

3. The thermally curable silicone rubber composition as claimed in claim 1 wherein the diorganopolysiloxane gum has an average degree of polymerization of at least 3,000.

4. The thermally curable silicone rubber composition as claimed in claim 2 wherein the substituted or unsubstituted monovalent hydrocarbon groups are composed of 2 mole % or less of alkenyl groups and 20 mole % or less of phenyl groups, the balance being methyl groups.

5. The thermally curable silicone rubber composition as claimed in claim 1 wherein the polyurethane elastomer is of the polyether type.

6. The thermally curable silicone rubber composition as claimed in claim 1 wherein the polyurethane elastomer is the polyester type.

7. The thermally curable silicone rubber composition as claimed in claim 5 wherein the polyether type polyurethane elastomer has an average degree of polymerization in the range from 1,000 to 6,000.

8. The thermally curable silicone rubber composition as claimed in claim 6 wherein the polyester type polyurethane elastomer has an average degree of polymerization in the range from 1,000 to 3,000.

9. The thermally curable silicone rubber composition as claimed in claim 1 wherein the organic peroxide is one selected from the class consisting of dicumyl peroxide, t-butyl peroxide, dichlorobenzoyl peroxide, benzoyl peroxide, t-butyl perbenzoate, and 2,5-dimethyl-2,5-bis(t-butylperoxy)hexane.

* * * * *